(12) United States Patent
Miyama

(10) Patent No.: US 12,073,813 B2
(45) Date of Patent: Aug. 27, 2024

(54) NON-TRANSITORY COMPUTER READABLE MEDIUM STORING ELECTRONIC MUSICAL INSTRUMENT PROGRAM, METHOD FOR MUSICAL SOUND GENERATION PROCESS AND ELECTRONIC MUSICAL INSTRUMENT

(71) Applicant: Roland Corporation, Shizuoka (JP)

(72) Inventor: Yusuke Miyama, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 18/486,765

(22) Filed: Oct. 13, 2023

(65) Prior Publication Data
US 2024/0038206 A1  Feb. 1, 2024

Related U.S. Application Data

(63) Continuation of application No. 17/308,054, filed on May 5, 2021, now Pat. No. 11,847,191.

(30) Foreign Application Priority Data

May 8, 2020 (JP) .................................. 2020-082550

(51) Int. Cl.
G06F 21/00 (2013.01)
G06F 21/10 (2013.01)
G10H 1/00 (2006.01)

(52) U.S. Cl.
CPC ......... *G10H 1/0041* (2013.01); *G06F 21/107* (2023.08); *G10H 1/0008* (2013.01);
(Continued)

(58) Field of Classification Search
None
See application file for complete search history.

(56) References Cited

U.S. PATENT DOCUMENTS 8,892,465 B2 * 11/2014 Mikkelsen .............. H04W 8/00
   705/26.1
10,032,441 B2 * 7/2018 Lyske ................ H04N 21/8456
(Continued)

FOREIGN PATENT DOCUMENTS

EP    1 345 105 A2    9/2003
JP    H06-171793 A    6/1994

OTHER PUBLICATIONS

Barate, Adriano et al. Managing Intellectual Property in a Music Fruition Environment. IEEE MultiMedia, vol. 23, Issue: 2. https://ieeexplore.ieee.org/stamp/stamp.jsp?tp=&arnumber=7330308 (Year: 2016).*

(Continued)

*Primary Examiner* — Jeremiah L Avery
(74) *Attorney, Agent, or Firm* — Foley & Lardner LLP

(57) ABSTRACT

An electronic musical instrument, method for a musical sound generation process and a non-transitory computer readable medium that stores an electronic musical instrument program are provided. The program causes a computer provided with a storage part to execute a musical sound generation process using sound data. The program causes the computer to execute: acquiring, from the storage part, first sound data and first user identification information indicating a user who has acquired the first sound data from a distribution server; acquiring second user identification information indicating a user who causes the musical sound generation process to be executed using the first sound data; determining whether or not the first user identification information matches the second user identification information; and inhibiting execution of the musical sound generation process using the first sound data in a case when the first user identification information does not match the second user identification information.

21 Claims, 7 Drawing Sheets

(52) U.S. Cl.
CPC ....... *G10H 1/0025* (2013.01); *G06F 21/1015* (2023.08); *G10H 2240/125* (2013.01); *G10H 2240/181* (2013.01)

(56) References Cited

U.S. PATENT DOCUMENTS

| | | | | |
|---|---|---|---|---|
| 10,587,430 | B1* | 3/2020 | Smith | G06F 9/542 |
| 11,954,147 | B1* | 4/2024 | Della Santa | G06F 16/637 |
| 2003/0093790 | A1* | 5/2003 | Logan | G06F 16/7867 |
| | | | | 348/E7.071 |
| 2005/0273399 | A1 | 12/2005 | Soma et al. | |
| 2009/0100092 | A1* | 4/2009 | Seiflein | G06F 21/10 |
| 2009/0183010 | A1* | 7/2009 | Schnell | H04W 12/06 |
| | | | | 713/193 |
| 2011/0099096 | A1* | 4/2011 | Shanley | G06Q 50/184 |
| | | | | 705/310 |
| 2011/0153362 | A1* | 6/2011 | Valin | G06Q 20/1085 |
| | | | | 340/5.82 |
| 2012/0311723 | A1* | 12/2012 | Britt, Jr. | G06Q 30/06 |
| | | | | 726/28 |
| 2014/0157431 | A1* | 6/2014 | Boss | H04L 63/10 |
| | | | | 726/27 |
| 2014/0270181 | A1* | 9/2014 | Siciliano | G11B 27/105 |
| | | | | 381/17 |
| 2015/0089613 | A1* | 3/2015 | Tippett | H04L 63/18 |
| | | | | 726/7 |
| 2017/0013372 | A1* | 1/2017 | Goorevich | H04R 25/554 |
| 2017/0041454 | A1* | 2/2017 | Nicholls | H04M 15/888 |
| 2017/0316089 | A1* | 11/2017 | Bucciarelli-Tieger | |
| | | | | B65D 1/0207 |
| 2018/0122260 | A1* | 5/2018 | Walder | G09B 15/023 |
| 2019/0087878 | A1* | 3/2019 | Gharabegian | H02S 40/32 |
| 2019/0238619 | A1* | 8/2019 | Mantrana-Exposito | |
| | | | | H04L 63/104 |
| 2019/0318060 | A1* | 10/2019 | Brenner | H04N 21/8113 |
| 2020/0152197 | A1* | 5/2020 | Penilla | H04L 67/125 |
| 2020/0184278 | A1* | 6/2020 | Zadeh | G06N 3/044 |
| 2020/0186504 | A1* | 6/2020 | Glassco | G06F 9/45558 |
| 2020/0191583 | A1* | 6/2020 | Ishikawa | G01C 21/28 |
| 2020/0204527 | A1* | 6/2020 | Vass | H04L 63/0428 |
| 2020/0275167 | A1* | 8/2020 | Ikezoye | G06Q 10/10 |
| 2020/0302951 | A1* | 9/2020 | Deng | G08B 1/08 |
| 2022/0383325 | A1* | 12/2022 | Hoffman | G06Q 20/4018 |

OTHER PUBLICATIONS

Lekic, Milica et al. An IoT Solution for Secured and Remote Sound Level Monitoring. 2019 18th International Symposium Infoteh-Jahorina (Infoteh). https://ieeexplore.ieee.org/stamp/stamp.jsp?tp=&arnumber=8717759 (Year: 2019).*

Zhao, Zhe-Yi et al. Music Sharing Platform Based on Sina App Engine. 2015 Ninth International Conference on Frontier of Computer Science and Technology. https://ieeexplore.ieee.org/stamp/stamp.jsp?tp=&arnumber=7314694 (Year: 2015).*

Kediyal, Prashant C.; Singh, Munindar P. Licit: Administering Usage Licenses in Federated Environments. IEEE Transactions on Services Computing, vol. 7, Issue: 1. https://ieeexplore.ieee.org/stamp/stamp.jsp?tp=&arnumber=6409349 (Year: 2013).*

Communication pursuant to Article 94(3) EPC issued by the European Patent Office in corresponding European Patent Application No. 21171792.1, dated Jul. 7, 2023, 7 pages.

Extended European Search Report issued by the European Patent Office in the corresponding European Patent Application No. 21171792.1, Oct. 1, 2021, 7 pages.

Lita, Adrian Loan, et al. Real time System for Instrumental Sound Extraction and Recognition, 2016 39th International Spring Seminar on Electronics Technology (ISSE). https://ieeexplore.ieee.org/stamp/stamp.jsp?tp=&arnumber=7563240 (Year: 2016).

Turchet, Luca, "Smart Musical Instruments: Vision, Design Principles, and Future Directions," IEEE Access, vol. 7. https://ieeexplore.ieee.org/stamp/stamp.jsp?tp=&arnumber=8501898 (Year: 2018).

* cited by examiner

NON-TRANSITORY COMPUTER READABLE MEDIUM STORING ELECTRONIC MUSICAL INSTRUMENT PROGRAM, METHOD FOR MUSICAL SOUND GENERATION PROCESS AND ELECTRONIC MUSICAL INSTRUMENT

CROSS-REFERENCE TO RELATED PATENT APPLICATIONS

This application is a continuation of U.S. patent application Ser. No. 17/308,054, filed on May 5, 2021, which claims the priority benefit of Japan Application Serial No. 2020-082550, filed on May 8, 2020. The entirety of each of the above-mentioned patent applications is hereby incorporated by reference herein and made a part of this specification.

BACKGROUND

Technical Field

The present disclosure relates to a non-transitory computer readable medium storing an electronic musical instrument program, a method for a musical sound generation process and an electronic musical instrument in which utilization of sound data that does not satisfy utilization conditions any more can be curbed.

Description of Related Art

For example, a system that performs control to prevent persons other than a user who has purchased sound data from using the sound data when sound data purchased by a user is downloaded from a server that distributes sound data to electronic musical instruments is known. According to Patent Document 1, a server determines whether or not sound data purchased by a user is available to an electronic musical instrument when the sound data is to be transmitted to the electronic musical instrument, the sound data not being transmitted to the electronic musical instrument in a case in which it is determined that the sound data is not available, and the sound data being transmitted to the electronic musical instrument only in a case in which it is determined that the sound data is available.

Patent Document

[Patent Document 1] Japanese Patent No. 6171793

However, the technique disclosed in Patent Document 1 listed above has a problem that sound data that has already been downloaded to an electronic musical instrument may be able to be used as it is even in a case in which the sound data originally was not available as a result of a change in utilization conditions or the like after the downloading of the sound data to the electronic musical instrument, since all to do when the purchased sound data is transmitted from a server to the electronic musical instrument is just to grant the utilization by the server. For example, there is a problem that even if a user who uses an electronic musical instrument changes in a case in which a utilization condition that a user who purchases sound data has to match the user who is using the electronic musical instrument is set, sound data purchased by the user before the change can be used.

SUMMARY OF THE INVENTION

According to an embodiment of the disclosure, there is provided a non-transitory computer readable medium that stores an electronic musical instrument program for causing a computer provided with a storage part to execute a musical sound generation process using sound data. The electronic musical instrument program causing the computer to execute: acquiring, from the storage part, first sound data and first user identification information indicating a user who has acquired the first sound data from a distribution server; acquiring second user identification information indicating a user who causes the musical sound generation process to be executed using the first sound data; making determination regarding whether or not the first user identification information matches the second user identification information; and inhibiting execution of the musical sound generation process using the first sound data in a case in which it is determined that the first user identification information does not match the second user identification information in the making of determination.

According to an embodiment of the disclosure, there is provided an electronic musical instrument that is provided with a storage part and executes a musical sound generation process using sound data. The electronic musical instrument includes: an acquisition section that acquires, from the storage part, first sound data and first user identification information indicating a user who has acquired the first sound data from a distribution server; a user acquisition section that acquires second user identification information indicating a user who causes the musical sound generation process to be executed using the first sound data; a user determination section that determines whether or not the first user identification information matches the second user identification information; and an inhibition section that inhibits execution of the musical sound generation process using the first sound data in a case in which the user determination section determines that the first user identification information does not match the second user identification information.

According to an embodiment of the disclosure, there is provided a method for a musical sound generation process that is a method for an electronic musical instrument provided with a storage part executing a musical sound generation process using sound data. The method includes: acquiring, from the storage part, first sound data and first user identification information indicating a user who has acquired the first sound data from a distribution server; acquiring second user identification information indicating a user who causes the musical sound generation process to be executed using the first sound data; making determination regarding whether or not the first user identification information matches the second user identification information; and inhibiting execution of the musical sound generation process using the first sound data in a case in which it is determined that the first user identification information does not match the second user identification information.

DETAILED DESCRIPTION

According to an embodiment of the disclosure, the disclosure provides a non-transitory computer readable medium storing an electronic musical instrument program, a method for a musical sound generation process and an electronic musical instrument capable of curbing utilization of sound data that does not satisfy utilization conditions any more.

Figure 1:
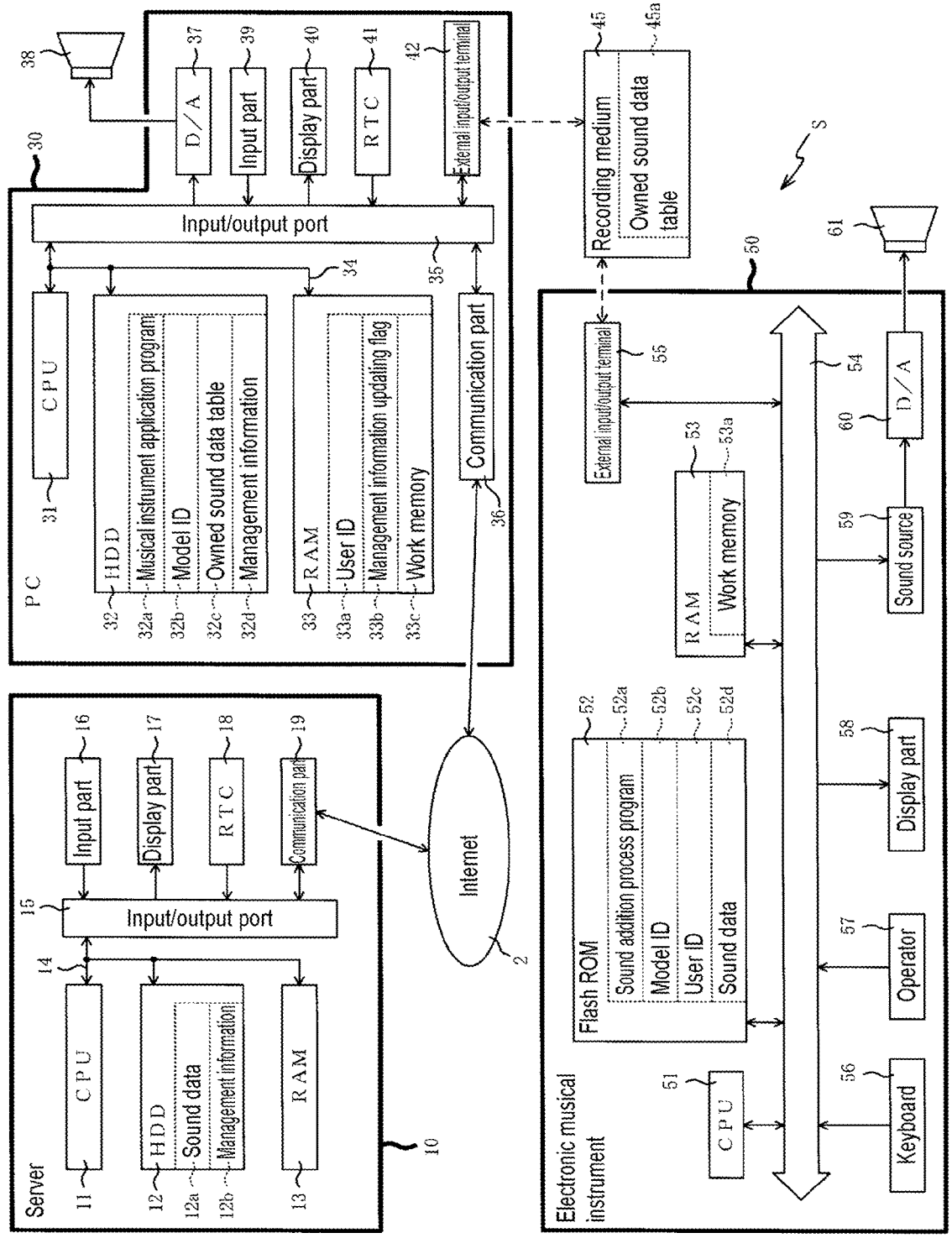
FIG. 1 is a block diagram illustrating electrical configurations of a PC, an electronic musical instrument, and a server that have an electronic musical instrument program according to an embodiment.

Hereinafter, preferred embodiments will be described with reference to the accompanying drawings. First, an overview of a data utilization system S including a personal computer (PC) 30 and an electronic musical instrument 50 will be described with reference to FIG. 1. FIG. 1 is a block diagram illustrating an electrical configuration of the data utilization system S. The data utilization system Sis configured to include a server 10 (distribution server), the PC connected to the server 10 via the Internet 2, and the electronic musical instrument 50 in which data is input and output with respect to the PC 30 via a recording medium 45.

The electronic musical instrument 50 is a synthesizer that mixes and outputs (emits sound) musical sound generated by a user performing an operation of playing a keyboard 56 and predetermined accompaniment sound or the like. The electronic musical instrument 50 performs a predetermined arithmetic operation on waveform data obtained by mixing sound data generated by the player playing the instrument, accompaniment sound, and the like and applies effects such as reverberation, chorus, and delay to the sound, through operations of a plurality of operators 57. The PC 30 operates like such a synthesizer by executing an instrument application program (electronic musical instrument program) 32*a* that is a so-called software synthesizer.

The server 10 is a computer that stores a plurality of pieces of sound data that is available for the software synthesizer of the PC 30 and the electronic musical instrument 50 and distributes the sound data to the PC 30 and the like. The PC 30 and the electronic musical instrument 50 are devices that the user has, and the server 10 is a device that a distributor of the sound data has.

The server 10 has a CPU 11, an HDD 12, and a RAM 13, each of which is connected to an input/output port 15 via a bus line 14. Also, each of an input part 16 that inputs a command from an administrator of the server 10, a display part 17 that displays information or the like at the time of input, a real-time clock (RTC) 18 that measures a date and a clock time, and a communication part 19 is connected to the input/output port 15.

The CPU 11 is an arithmetic operation device that controls each part connected via the bus line 14. The HDD 12 is a rewritable non-volatile storage device that stores various programs, fixed value data, and the like during execution by the CPU 11. The HDD 12 is provided with a sound data memory 12*a* and a management information memory 12*b*. These are illustrated as "sound data" and "management information", respectively, in FIG. 1.

The sound data memory 12*a* is a memory in which a plurality of pieces of sound data that is available for the PC 30 and the electronic musical instrument 50 is stored. The sound data is sound source data of musical sound generated by the software synthesizer of the PC 30 and the electronic musical instrument 50. Also, the sound data includes parameter values and waveform information related to tones.

When the server 10 receives a request for outputting sound data to the PC 30 or the like from the user of the PC 30 and the electronic musical instrument 50, the server 10 outputs the sound data to the PC 30 or the like that is an origin of the request. When the server 10 outputs the sound data to the PC 30 or the like, authentication information when the sound data is used by the PC 30 or the like is also output from the server 10. Details of the authentication information will be described later.

Figure 2:
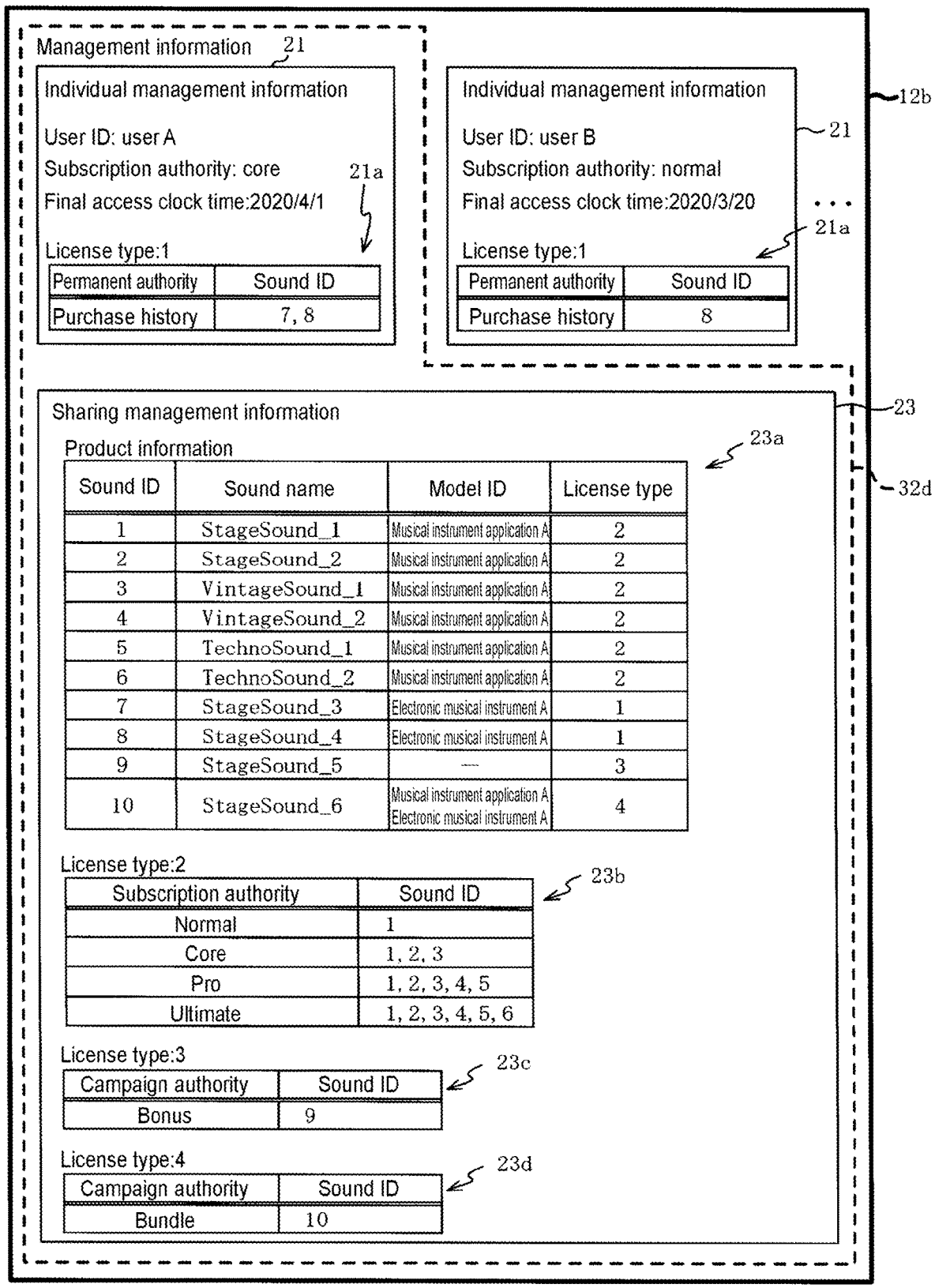
FIG. 2 is a diagram schematically illustrating content in a management information memory.

Referring to FIG. 2, the management information memory 12*b* will be described. FIG. 2 is a diagram schematically illustrating content in the management information memory 12*b*. The management information memory 12*b* is a memory in which management information such as product information related to sound data that can be distributed (output) to each user is stored. The management information stored in the management information memory 12*b* includes individual management information 21 for each user who has registered for a service to obtain sound data from the server 10 and sharing management information 23 that is common to all the users.

The individual management information 21 stores a user ID (user identification information) for identifying a user who has registered for this service, a subscription authority (user authority) representing a contract type for service utilization of the user, a last access clock time that is a clock time when a user last accessed the server 10 acquired from the RTC 18, and a purchase history memory 21*a* indicating a purchase history of the user. The user ID is different for each registered user and may be set as a "user A" and a "user B", for example. Also, if the registration of a user is canceled, then the individual management information 21 including the user ID of that user is deleted.

As the subscription authority, one of "normal", "core", "pro", and "ultimate" is set. "Core", "pro", and "ultimate" indicate contract states of users paying monthly flat-rate fees or the like and purchasing rights to use sound data of specific sound IDs for specific periods of time. "Ultimate" is a contract type according to which all pieces of sound data that are available with the subscription authority can be used. In addition, the available sound data decreases in order of "pro", "core", and "normal". "Normal" indicates a contract type of a user who has not paid a flat-rate fee. However, "normal", "core", and "pro" users can also move to "ultimate" for a specific period of time only if they pay a fee for that specific period of time.

The purchase history memory 21*a* is a memory that stores a sound ID indicating identification information of the sound data purchased by the user. The sound data purchased by the user does not have a date of expiry, and the user who purchased the sound data is permanently permitted to use the sound data. A license type "1" indicating a permanent type for which permanent utilization is permitted is set for the sound data that can be obtained through purchase.

The sharing management information 23 includes a product information table 23*a* that stores product information of sound data. The product information table 23*a* stores information related to sound data that is currently being distributed and sound data distributed in the past. Specifically, the product information table 23*a* stores each of a sound ID of sound data, a sound name indicating a name of the sound data, a model ID indicating a model that can use the sound data, and a license type of the sound data for each piece of sound data.

Every time new sound data is distributed, contents in the product information table 23a are updated in accordance with an input from the administrator to the input part 16. However, the sound ID, the sound name, and the license type in the product information table 23a are basically not able to be edited once defined. In a case in which it is desired to change the license type of the sound data after distribution, for example, a new sound ID indicating that the data is the same as the sound data after the distribution is acquired, and the sound ID and the license type that is desired to be changed are stored in the product information table 23a in an associated manner.

The model ID is identification information indicating the type of the software synthesizer (instrument application program 32a) of the PC 30 that uses the sound data and identification information indicating the type of the electronic musical instrument 50. The model ID of the software synthesizer of the PC 30 is "musical instrument application A", and the model ID of the electronic musical instrument 50 is "electronic musical instrument A". Also, in a case in which a new device or a program for a software synthesizer is released, a model ID unique to the device or the program may be added to a region of the model ID in the product information table 23a.

Also, in a case in which no model ID has been set for sound data of product information, this means that the sound data is available for any model. In other words, in a case in which the sound data is available for any model, "-" is set as an identifier that matches all model IDs in the model IDs associated with the sound data.

The license type indicates a utilization form of the sound data based on a contract type for the user to use the service, purchase, free distribution, or the like. The license type "1" indicates that the utilization form of the sound data is based on purchase as described above.

The license type "2" indicates that the utilization form of the sound data is based on the contract type and indicates that utilization of the sound data is granted using a subscription authority representing the contract type. The sharing management information 23 includes an authority table 23b related to the license type "2" in addition to the product information table 23a. The authority table 23b stores a sound ID available with each subscription authority. The fact that sound data with the sound ID 1 is available in a case in which the subscription authority is "normal" is stored in the authority table 23b. Similarly, the fact that sound data with sound IDs 1, 2, and 3 is available in a case in which the subscription authority is "core", sound data with sound IDs 1, 2, 3, 4, and 5 is available in a case in which the subscription authority is "pro", and all sound data that has sound IDs 1, 2, 3, 4, 5, and 6 and is associated with the license type "2" is available in a case in which the subscription authority is "ultimate" is stored in the authority table 23b.

The license types "3" and "4" indicate that the utilization form of the sound data is based on a campaign (a project such as free distribution). The sharing management information 23 includes a campaign table 23c related to the license type "3" and a campaign table 23d related to the license type "4" in addition to the product information table 23a and the authority table 23b. The campaign tables 23c and 23d store sound IDs of sound data that has been distributed through a campaign and is currently available for each type of campaign. The fact that the sound data with a sound ID 9 has been distributed for free as a bonus in a campaign and is currently available is stored in the campaign table 23c.

The fact that sound data with a sound ID 10 has been distributed for free in a campaign as a bundle and is currently available is stored in the campaign table 23d related to the license type "4". A bundle campaign is for distributing sound data to a user who purchases each of the software synthesizer of the PC 30 and the electronic musical instrument 50 in a predetermined period of time, for example. Therefore, "musical instrument application A" and "electronic musical instrument A" are set for a model ID with which sound data of a license type "4" is available. Models that can use the sound data of the license type "4" can be limited afterward by deleting either of these two model IDs after a predetermined period of time from the distribution of the sound data in the bundle campaign.

The sound IDs stored in the authority table 23b and the campaign tables 23c and 23d can be changed in accordance with inputs from the administrator of the server 10 to the input part 16. In addition, if the subscription authority that the user has is changed as stored in the authority table 23b, sound data that is available for the user is also changed. Therefore, the license types "2", "3", and "4" indicate non-permanent types in which granting of utilization of sound data changes for the user indicated by the user ID on the basis of the management information defined in the server 10.

FIG. 1 will be referred to again. The RAM 13 is a memory that stores various kinds of work data, flags, and the like in a rewritable manner when the CPU 11 executes programs such as a control program. The communication part 19 is a device connected to the PC 30 via the Internet 2 for transmitting and receiving various kinds of data to and from the PC 30.

If the server 10 receives a request to transmit management information to the PC from a registered user, then the server 10 transmits the management information including the individual management information 21 and the sharing management information 23 related to the user to the PC 30 via the communication part 19. Also, if the server 10 receives a request to transmit sound data to the PC 30 from the registered user, then the server 10 transmits the requested sound data and authentication information for certifying the sound data to the PC 30 via the communication part 19. The authentication information includes a sound ID, a model ID, and a license type associated with the sound name of the requested sound data in the product information table 23a and a user ID of the user who has requested the sound data.

Also, it is not always necessary to transmit a request signal to transmit the management information and the sound data to the PC 30 from the PC 30 to the server 10. If the request signal includes requested information, a user ID of a registered user, and a transmission destination, then the request signal may be transmitted to the server 10 from a PC that is different from the PC 30, a mobile phone device, or the like via the Internet 2. In a case in which a web site for requesting sound data is logged into from the PC 30 to request for transmission of specific sound data to the PC 30, for example, the sound data and the authentication information including the user ID used to log into the website are transmitted to the PC 30 in an associated state.

The PC 30 has a CPU 31, an HDD 32, and a RAM 33, each of which is connected to an input/output port 35 via a bus line 34. Also, each of a communication part 36, a digital-to-analog (D/A converter) 37, an input part 39 such as a mouse and a keyboard for inputting commands from the user (player), a display part 40 that displays information at the time of input and the like, an RTC 41 configured in the same manner as the RTC 18 of the server 10, and an external input/output terminal 42 is connected to the input/output port 35. A speaker 38 is connected to the D/A 37.

The CPU 31 is an arithmetic operation device that controls each part connected via the bus line 34. The HDD 32 is a rewritable non-volatile storage device. The HDD 32 is provided with each of an instrument application program 32a, a model ID memory 32b, an owned sound data table 32c, and a management information memory 32d. In FIG. 1, the model ID memory 32b and the management information memory 32d are illustrated as "model ID" and "management information", respectively.

The instrument application program 32a is a program for the software synthesizer that causes the PC 30 to operate as a synthesizer. If the CPU 31 executes the instrument application program 32a, an activation process (see FIG. 4(a)) is executed immediately after the execution, and a timer process (see FIG. 4(b)) is executed at every hour measured by the RTC 41. In the activation process, a management information updating process (see FIG. 5) is executed. Moreover, a sound data loading process (see FIG. 6) is executed as an interruption process when sound data used for the musical sound generation process is selected from the owned sound data table 32c in the HDD 32.

Also, in a state in which the CPU 31 is executing the instrument application program 32a, a process of requesting for transmission of sound data from the server 10 to the PC 30, a process (data storage step) of storing the sound data and the authentication information acquired from the server 10, or a portable storage device, and the like in the owned sound data table 32c, a process of creating/editing the sound data, and the like are performed in accordance with inputs to the input part 39.

Moreover, in a case in which performance information is input from the input part 39 in the state in which the CPU 31 is executing the instrument application program 32a, a process of executing the musical sound generation process of generating musical sound signals in accordance with various setting values and the like and outputting the musical sound signals to the D/A 37 is performed. The D/A 37 converts digital musical sound signals into analog signals and outputs the analog signals to the speaker 38. The speaker 38 generates musical sound based on the musical sound signals output from the D/A 37.

The model ID memory 32b is a memory that stores a model ID unique to the instrument application program 32a (software synthesizer). When the user installs the instrument application program 32a in the PC 30, the model ID unique to the instrument application program 32a is stored in the model ID memory 32b.

Figure 3:
FIG. 3 is a diagram schematically illustrating content in an owned sound data table.

Referring to FIG. 3, the owned sound data table 32c will be described. FIG. 3 is a diagram schematically illustrating content in the owned sound data table 32c. The owned sound data table 32c stores sound data received from the server 10 via the Internet 2 and authentication information for certifying the sound data in an associated manner. The authentication information includes a sound ID, a user ID, a model ID, and a license type as described above.

Description will be returned to FIG. 1. The management information memory 32d stores management information received from the server 10 via the internet 2. The management information stored in the management information memory 32d includes individual management information 21 with a user ID stored in the user ID memory 33a in the RAM 33 and sharing management information 23. In a case in which the user ID stored in the user ID memory 33a is "user A", for example, the management information memory 32d stores management information in the region illustrated with the dashed line in FIG. 2 that includes the individual management information 21 with the user ID of "user A" and the sharing management information 23.

Also, a clock time when the server 10 transmits the management information to the PC 30 is stored in a final access clock time in the individual management information 21 in the management information stored in the management information memory 32d. This is because the management information is output from the server 10 to the PC 30 in a state in which a clock time when the user accesses the server 10 to transmit the management information to the PC 30 is stored in the final access clock time in the individual management information 21 of the user. Also, the clock time when the server 10 transmits the management information to the PC 30 can be regarded as being the same as the clock time when the PC 30 stores the management information.

The RAM 33 is a memory that stores various kinds of work data, flags, and the like in a rewritable manner when the CPU 31 executes programs such as the instrument application program 32a. The RAM 33 is provided with each of a user ID memory 33a, a management information updating flag 33b, and a work memory 33c. In FIG. 1, the user ID memory 33a is illustrated as "user ID".

The user ID memory 33a is a memory that stores the user ID of the user who is using the instrument application program 32a on the PC 30. The value of the user ID memory 33a is initialized with an invalid value immediately after the CPU 31 executes the instrument application program 32a. In order for the user to use the instrument application program 32a in the activation process in FIG. 4, a user ID used for logging-in is stored in the user ID memory 33a after the user logs in the program using the user ID and a password (FIG. 4, S2).

The management information updating flag 33b is a flag indicating that the management information stored in the management information memory 32d has been updated to the latest one and indicating whether or not the management information is available for granting utilization of the sound data. Specifically, in a case in which the management information updating flag 33b is turned on, this indicates that the management information stored in the management information memory 32d is available for granting utilization of the sound data. The management information updating flag 33b is set to be OFF immediately after the CPU 31 executes the instrument application program 32a.

Figure 5:
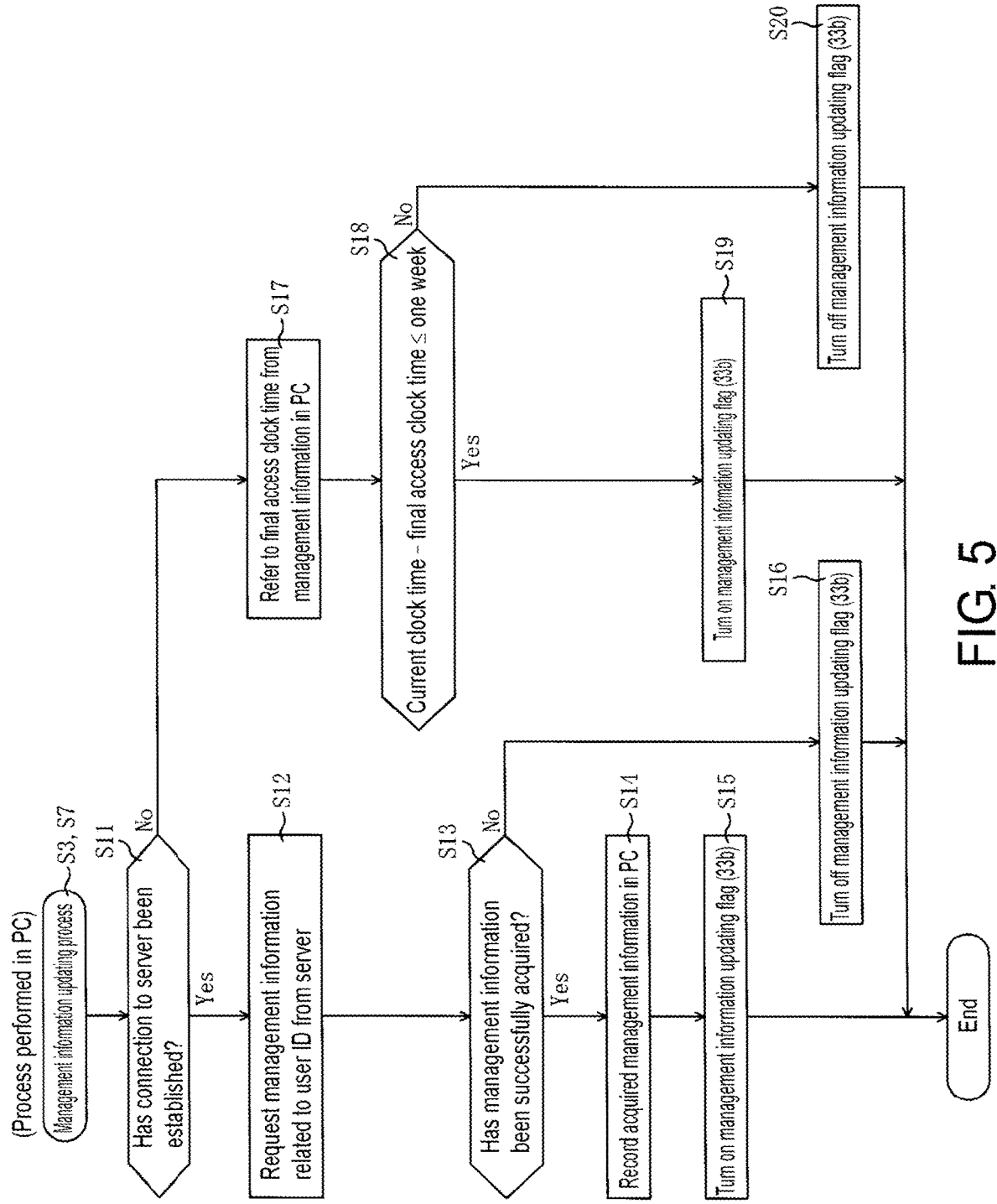
FIG. 5 is a flowchart of a management information updating process.

The management information updating flag 33b is set to be ON in a case in which the management information in accordance with the user identification information stored in the user ID memory 33a was able to be acquired from the server 10 (FIG. 5, S15) and is set to be OFF in a case in which the management information was not able to be acquired (FIG. 5, S16), in a state in which the PC 30 is connected to the server 10 in the management information updating process in FIG. 5. Also, the management information updating flag 33b is set to be ON in a case in which an elapsed time from the clock time when the management information acquired from the server 10 is stored in the management information memory 32d to the current clock time is within one week (FIG. 5, S19), and the management information updating flag 33b is set to be OFF in a case in which the elapsed time exceeds one week (FIG. 5, S20), in a state in which the PC 30 is not connected to the server 10.

Figure 6:
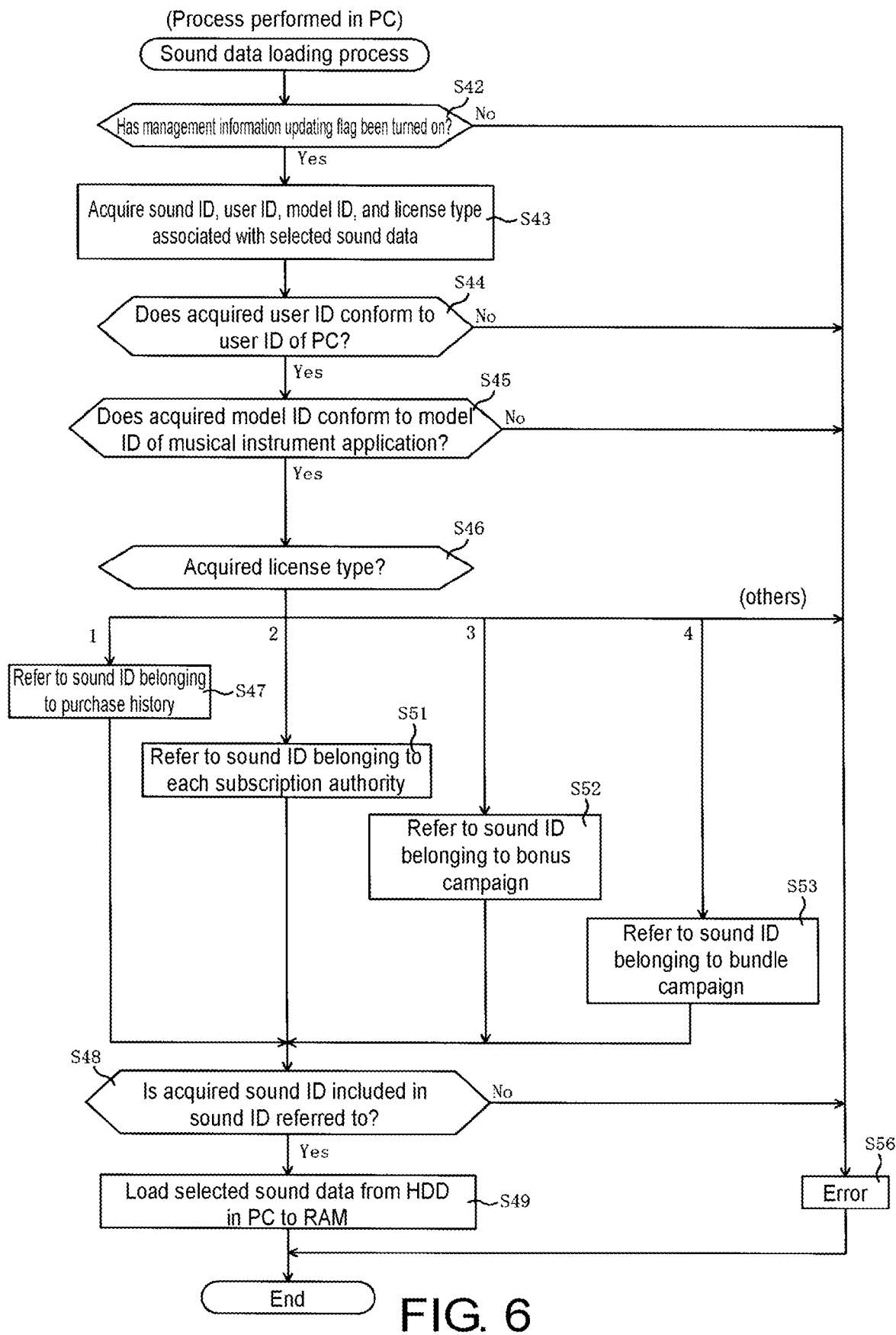
FIG. 6 is a flowchart of a sound data loading process.

The work memory 33c is a memory that stores sound data used for the musical sound generation process in accordance with an input from the input part 39. The work memory 33c stores preset sound data and is initialized immediately after the CPU 31 executes the instrument application program 32a. Also, the preset sound data is data stored in a predetermined region (not illustrated) in the HDD 32 when the user installs the instrument application program 32a in the PC 30. In a case in which it is determined that sound data selected from the owned sound data table 32c is available in the sound data loading process in FIG. 6, the sound data is stored in the work memory 33c (FIG. 6, S49).

The communication part 36 is a device that is connected to the server 10 via the Internet 2 for transmitting and receiving various kinds of data to and from the server 10. The external input/output terminal 42 is an interface for transmitting and receiving various kinds of data to and from a portable recording medium 45.

The recording medium 45 is a rewritable non-volatile storage device and is configured to be able to be attached to and detached from the external input/output terminal 42. The recording medium 45 is provided with the owned sound data table 45a. The configuration of the owned sound data table 45a is the same as the configuration of the owned sound data table 32c in the PC 30. The owned sound data table 45a stores sound data and authentication information, for which copy has been selected, among the sound data and the authentication information stored in the owned sound data table 32c. The present embodiment will be described on the assumption that all the sound data and the authentication information stored in the owned sound data table 32c are stored in the owned sound data table 45a.

Referring to FIGS. 4(a) to 6, the activation process, the timer process, and the sound data loading process executed by the CPU 31 in the PC 30 will be described. The activation process is executed immediately after the CPU 31 executes the instrument application program 32a. In the activation process, logging-in performed by the user to use the instrument application program 32a and the management information updating process (FIG. 5) are executed.

Figure 4A:
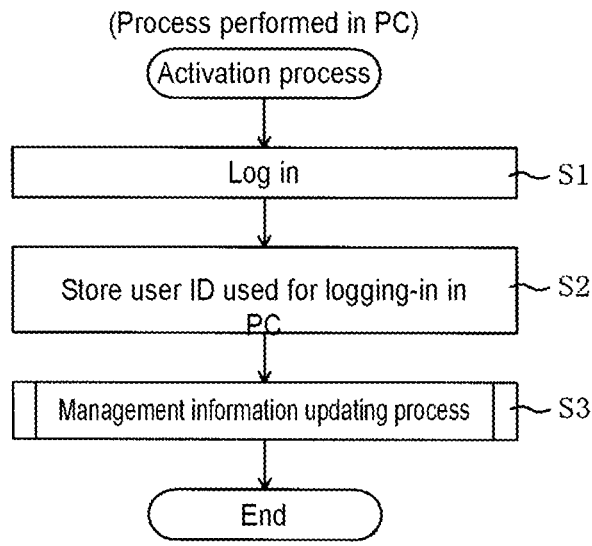
FIG. 4(a) is a flowchart of an activation process executed by a CPU of the PC.

FIG. 4(a) is a flowchart of the activation process. In the activation process, a user is caused to input a user ID and a password using the input part 39 to log in the program (S1). Also, if the PC 30 is not in a state in which an unspecified large number of users cannot use the PC 30, similar logging-in of the user may be automatically performed after an initial input using the input part 39.

After the process in S1, the user ID used for the logging-in is stored in the user ID memory 33a of the RAM 33 in the PC 30 (S2). The CPU 31 recognizes that the user indicated by the user ID stored in the user ID memory 33a is currently operating the PC 30 on which the instrument application program 32a is being executed (the instrument application program 32a is being used).

After the process in S2, the management information updating process for updating the management information stored in the management information memory 32d is performed (S3), and the activation process is then ended. Details of the management information updating process will be described later with reference to FIG. 5.

Figure 4B:
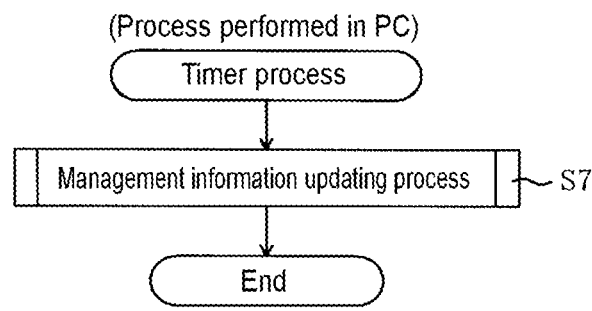
FIG. 4(b) is a flowchart of a timer process.

As illustrated in FIG. 4(b), the timer process is repeatedly executed at every one hour through an interval interruption process at every one hour after the CPU 31 executes the instrument application program 32a. The timer process is ended after the same management information updating process as the management information updating process (S3) in the activation process in FIG. 4(a) is performed (S7). Through the timer process, the management information is periodically updated to the latest one. Also, the management information updating process (S3, S7) may be performed in a case in which an input for updating the management information is provided from the input part 39.

Next, the management information updating process (S3, S7) executed during the activation process in FIG. 4(a) and the timer process in FIG. 4(b) will be described with reference to FIG. 5. In the management information updating process (S3, S7), a process of acquiring the latest management information from the server 10 and turning-on and turning-off of the management information updating flag 33b are performed.

FIG. 5 is a flowchart of the management information updating process (S3, S7). In the management information updating process (S3, S7), whether or not the PC 30 is connected to the server 10 by the communication part 36 via the Internet 2 is checked in order to determine whether or not the management information can be acquired from the server 10 first (S11). In a case in which the PC 30 is connected to the server 10 (S11: Yes), a request to transmit, to the PC 30, management information related to the user ID indicating the user who is currently using the PC 30 and stored in the user ID memory 33a in the PC 30 is provided to the server 10 (S12).

After the process in S12, whether or not the management information including the individual management information 21 including the user ID stored in the user ID memory 33a and the sharing management information 23 has successfully been acquired is checked (S13). In other words, whether or not the management information including the individual management information 21 related to the user who is operating the PC 30 has been able to be acquired from the server 10 as requested is checked in the process in S13.

In a case in which the management information has been able to be acquired by the PC 30 from the server 10 as requested in the process in S13 (S13: Yes), the management information acquired by the PC 30 from the server 10 is stored in the management information memory 32d in the PC 30 (S14). Since the latest management information is stored in the management information memory 32d, the management information updating flag 33b is turned on (SIS) such that the management information stored in the management information memory 32d can be used to grant utilization of sound data after the process in S14, and the management information updating process (S3, S7) is then ended.

In a case in which the management information has not been able to be acquired from the server 10 as requested in the process in S 13 (S13: No), the management information updating flag 33b is turned off (S16), and the management information updating process (S3, S7) is ended. The case in which the management information has not been able to be acquired from the server 10 as requested (S13: No) regardless of the established connection to the server 10 (S11: Yes) indicates a case in which the individual management information 21 such as a user ID is not present on the side of the server 10 due to cancelation or the like of registration of the user indicated by the user ID stored in the user ID memory 33a. In this case, since the user who is using the PC 30 (who is using the instrument application program 32a) is not in a state in which the user can use the sound data acquired from the server 10, the management information updating flag 33b is turned off, such that the sound data that has already been stored in the owned sound data table 32c in the PC 30 cannot be used.

In a case in which the PC 30 is not connected to the server 10 in the process in S11 (S11: No), a final access clock time is acquired from the individual management information 21 of the management information stored in the management information memory 32d in the PC 30 (S17). The final access clock time indicates a clock time when the latest management information is stored in the management information memory 32*d*. Also, in a case in which the individual management information 21 of the user ID stored in the user ID memory 33*a* is not present in the management information stored in the management information memory 32*d*, a clock time passed surely one week or more before the current clock time is acquired as the final access clock time.

After the process in S17, whether or not a difference between the current clock time and the final access clock time (an elapsed time from the final access clock time to the current clock time) is within one week is checked (S18). In a case in which the difference between the current clock time and the final access clock time is within one week (S18: Yes), the management information updating flag 33*b* is turned on (S19), and the management information updating process (S3, S7) is ended. Since there is a high probability that the management information that the PC 30 has matches the management information that the server 10 has if the elapsed time after the last clock time when the management information is stored in the management information memory 32*d* in the PC 30 is within one week, the management information updating flag 33*b* is turned on such that the management information stored in the management information memory 32*d* can be used to grant the utilization of the sound data.

On the other hand, in a case in which the difference between the current clock time and the final access clock time exceeds one week in the process in S18 (S18: No), the management information updating flag 33*b* is turned off (S20), and the management information updating process (S3, S7) is ended. This is because there is a high probability that the management information that the PC 30 has does not match the latest management information that the server 10 has and it is not desirable to grant the utilization of the sound data using the management information that the PC 30 has. For example, in a case in which the user has canceled or changed the aforementioned subscription authority, it is possible to prevent the user to continue to use the sound data that is available on the basis of the subscription authority until now and to provide a margin to a period after which the sound data cannot be used.

Next, the sound data loading process (hereinafter, referred to as a "loading process") will be described with reference to FIG. 6. The loading process is an interruption process executed by the CPU 31 when sound data to be used for the musical sound generation process is selected from the owned sound data table 32*c* in the HDD 32 and the sound data is acquired by the CPU 31 (a part of the acquisition step and the acquisition section), and utilization of the selected sound data is granted. Also, as the selection of the sound data, a case in which the user selects a part of a plurality of pieces of sound data stored in the owned sound data table 32*c* using the input part 39, a case in which the user selects all the plurality of pieces of sound data using the input part 39, and a case in which a part or entirety of the plurality of pieces of sound data is automatically selected after the activation process are exemplified.

FIG. 6 is a flowchart of the loading process. In the loading process, whether or not the management information updating flag 33*b* has been turned on is checked in order to determine whether or not utilization of the sound data can be granted using the management information stored in the management information memory 32*d* first (S42).

In a case in which the management information updating flag 33*b* has been turned off (S42: No), it is not possible to grant the utilization of the sound data using the management information stored in the management information memory 32*d*, the utilization of the sound data selected at the time of activation of the loading process is thus inhibited (S56), and the loading process is ended. In other words, in the process in S56, the selected sound data is not stored in the work memory 33*c*, and the sound data originally stored in the work memory 33*c* is used for the musical sound generation process performed later. Further, in the process in S56, an error message related to inhibition of the utilization of the selected sound data is displayed on the display part 40. Also, in a case in which the management information updating flag 33*b* has been turned off (S42: No), content of providing a command to receive the latest management information from the server may be displayed for the user as an error message to be displayed in the process in S56.

In a case in which the management information updating flag 33*b* has been turned on in the process in S42 (S42: Yes), there is a probability that the sound data selected at the time of the activation of the loading process is available, each of a sound ID, a user ID, a model ID, and a license type stored in the owned sound data table 32*c* in association with the selected sound data is thus acquired (S43). Then, whether or not the user ID acquired in the process in S43 match the user ID that is stored in the user ID memory 33*a* in the PC 30 and indicates the user who is using the instrument application program 32*a* (PC 30) is checked (S44).

In a case in which the user IDs do not match each other in the process in S44 (S44: No), the process in S56 of inhibiting the utilization of the selected sound data is performed, and the loading process is then ended. In a case in which the user ID stored in the user ID memory 33*a* in the PC 30 is "user A", for example, utilization of the sound data No. 4 (sound ID "10") with the user ID of "user B" in the sound data stored in the owned sound data table 32*c* illustrated in FIG. 3 on the PC 30 is inhibited. Also, an error message indicating that the user IDs do not match each other or the like may be displayed as an error message displayed in the process in S56 in a case in which the user IDs do not match each other (S44: No).

In a case in which the user ID acquired in the process in S43 matches the user ID of the PC 30 in the process in S44 (S44: Yes), there is a probability that the sound data selected in the process in S41 is available. In a case in which the user ID in the user ID memory 33*a* in the PC 30 is "user A", for example, sound data Nos. 1, 2, and 3 with the matching user ID in the sound data stored in the owned sound data table 32*c* illustrated in FIG. 3 is available on the PC 30. Thus, whether or not at least one of model IDs acquired in the process in S43 matches the model ID that is stored in the model ID memory 32*b* in the PC 30 and is unique to the instrument application program 32*a* that is currently being executed by the CPU 31 is checked (S45).

In a case in which the model IDs do not match each other (S45: No), the process in S56 of inhibiting the utilization of the sound data selected in the process in S41 is performed, and the loading process is then ended. In a case in which the model ID of the instrument application program 32*a* is "musical instrument application A", for example, utilization of the sound data No. 1 (sound ID "7") with a model ID "electronic musical instrument A" in the sound data stored in the owned sound data table 32*c* illustrated in FIG. 3 on the PC 30 is inhibited even if the user IDs match each other in the process in S44. Also, an error message indicating that the model IDs do not match each other or the like may be displayed as an error message displayed in the process in S56 in a case in which the model IDs do not match each other (S45: No).

In a case in which the model ID acquired in the process in S43 matches the model ID of the instrument application program 32a in the process in S45 (S45: Yes), there is a probability that the sound data selected at the time of the activation of the loading process is available. In a case in which the model ID of the instrument application program 32a is "musical instrument application A", for example, there is a probability that the sound data Nos. 2 and 4 including the same model ID and the sound data No. 3 that matches all the model IDs (no specific model ID has been set) in the sound data stored in the owned sound data table 32c illustrated in FIG. 3 are available on the PC 30. Thus, the license type acquired in the process in S43 is checked (S46).

In a case in which the license type is a license type "1" that the utilization form of the sound data is based on purchase (S46: 1), a sound ID belonging to the purchase history memory 21a related to the license type "1" is referred to using the management information stored in the management information memory 32d (S47). As described above, the sound ID of the individual management information 21 of the user who is using the instrument application program 32a that is stored in the purchase history memory 21a is the sound ID of the sound data that is available as a license type "1".

In a case in which the license type acquired in the process in S43 is a license type "2" that the utilization form of the sound data is based on a contract type in the process in S46 (S46: 2), the sound ID belonging to each subscription authority related to the license type "2" is referred to using the management information stored in the management information memory 32d (S51). Specific description will now be given using the management information illustrated in FIG. 2. The management information stored in the management information memory 32d includes the subscription authority stored in the individual management information 21 of the user who is using the instrument application program 32a and the authority table 23b storing the sound ID of the sound data that is available for each subscription authority. Therefore, the sound ID of the sound data that is available with the subscription authority representing the contract type of the user who is using the PC 30 is referred to on the basis of the authority table 23b in the process in S51.

In a case in which the license type acquired in the process in S43 is a license type "3" that the utilization form of the sound data is based on free distribution in the process in S46 (S46: 3), the sound ID belonging to a bonus campaign related to the license type "3" is referred to using the management information stored in the management information memory 32d (S52). Specifically, the sound ID stored in the campaign table 23c of the management information is referred to. The campaign table 23c stores the sound ID of the sound data that is available for the license type "3".

In a case in which the license type acquired in the process in S43 is a license type "4" that the utilization form of the sound data is based on free distribution in the process in S46 (S46: 4), the sound ID belonging to a bundle campaign related to the license type "4" is referred to using the management information stored in the management information memory 32d (S53). Specifically, the sound ID stored in the campaign table 23d of the management information is referred to. The campaign table 23d stores the sound ID of the sound data that is available for the license type "4".

After any of the processes in S47, S51, S52, and S53, whether or not the sound ID referred to using the management information in the management information memory 32d includes the sound ID acquired in the process in S43 is checked (S48). In a case in which the sound ID referred to using the management information includes the sound ID acquired in the process in S43 (S48: Yes), it is determined that the sound data indicated by the sound ID, that is, the sound data selected at the time of the activation of the loading process is available for the musical sound generation process, the selected sound data is thus stored in the work memory 33c (S49), and the loading process is ended.

On the other hand, in a case in which the sound ID referred to using the management information does not include the sound ID acquired in the process in S43 in the process in S48 (S48: No), the process in S56 of inhibiting the utilization of the selected sound data is performed, and the loading process is then ended.

For example, the owned sound data table 32c illustrated in FIG. 3 stores the sound data No. 1 (sound ID "7") related to the license type "1". As illustrated in FIG. 2, in a case in which the individual management information 21 of the management information stored in the management information memory 32d is information of the user ID "user A", the sound IDs of the sound data that is available for the license type "1" are "7" and "8". Therefore, if the user IDs and the model IDs related to the sound data No. 1 match each other in the processes in S44 and S45, then the sound data is available for the musical sound generation process through the processes in S48 and S49. On the other hand, in a case in which the individual management information 21 in the management information memory 32d is information of the user ID "user B", the sound ID of the sound data that is available for the license type "1" is only "8", and the sound data is thus not available for the musical sound generation process through the processes in S48 and S56 even if the user IDs and the model IDs associated with the sound data No. 1 match each other in the processes in S44 and S45.

Also, the sound data stored in the owned sound data table 32c illustrated in FIG. 3 includes sound data No. 2 (sound ID "1") associated with the license type "2". As illustrated in FIG. 2, in a case in which the individual management information 21 of the management information stored in the management information memory 32d is information of the user ID "user A", the subscription authority of the user is "core", and the sound IDs "1", "2", and "3" are thus referred to using the authority table 23b in the process in S51. Therefore, if the user IDs and the model IDs associated with the sound data No. 2 match each other in the processes in S44 and S45, the sound data No. 2 is available for the musical sound generation process through the processes in S48 and S49.

On the other hand, as illustrated in the product information table 23a, the sound data associated with the license type "2" does not include "4", "5", and "6" as sound IDs to be referred to using the authority table 23b in the process in S51 when the subscription authority is "core" although the sound data includes sound data with the sound IDs "4", "5" and "6". Therefore, the sound data with the sound IDs "4", "5", and "6" is not available for the musical sound generation process through the processes in S48 and S56 even if the sound data with the sound IDs "4", "5", and "6" is stored in the owned sound data table 32c and the user IDs and the model IDs associated with the sound data with the sound IDs "4", "5", and "6" match each other in the processes in S44 and S45. However, the sound data with the sound IDs "4", "5", and "6" is available for the musical sound generation process if the user IDs and the model IDs match each other in the processes in S44 and S45 by changing the subscription authority from "core" to "ultimate" with which all the pieces of sound data associated with the license type "2" is available.

Similarly, the owned sound data table 32c stores sound data Nos. 3 and 4 (sound IDs "9" and "10") associated with the license types "3" and "4", respectively. Since the sound IDs "9" and "10" are referred to using the campaign tables 23c and 23d of the sharing management information 23 in the processes in S52 and S53, the sound data is available for the musical sound generation process through the processes in S48 and S49 if the user IDs and the model IDs associated with the sound data Nos. 3 and 4 match each other in the processes in S44 and S45. On the other hand, in a case in which the campaign tables 23c and 23d do not include the sound IDs "9" and "10", the sound data is not available for the musical sound generation process through the processes in S48 and S56 even if the user IDs and the model IDs associated with the sound data Nos. 3 and 4 match each other in the processes in S44 and S45.

In a case in which the license type is not any of "1" to "4" and is the license type "5", for example, in the process in S46 (S46: others), the sound data selected at the time of the activation of the loading process is not compatible with the utilization in the instrument application program 32a executed by the PC 30, the process in S56 of inhibiting the utilization of the selected sound data is thus performed, and the loading process is then ended. An error message indicating a non-compatible license type or the like may be displayed as an error message displayed in the process in S56 in a case in which the license type is not any of "1" to "4" (S46: others). Also, a license type indicating a utilization form of sound data based on an elapsed time after downloading of the sound data in the PC 30 is exemplified as the license type "5".

The PC 30 on which the instrument application program 32a as described above is executed is not adapted to determine whether or not a user ID of authentication information matches the user ID of the user who is using the instrument application program 32a that is stored in the user ID memory 33a when the sound data and the authentication information received from the server 10 are stored in the owned sound data table 32c. The PC 30 determines whether or not the user IDs match each other every time sound data to be used for the musical sound generation process (sound generation signal generation process) is selected from the sound data that has already been stored in the owned sound data table 32c in the PC 30 and inhibits utilization of the sound data in a case in which the user IDs do not match each other, through the processes in S43, S44, and S56 in FIG. 6.

In this manner, since the user ID of the user who is using (logging in) the instrument application program 32a does not match the user ID associated with sound data purchased by a user who is different from the user who is using the instrument application program 32a even if the sound data purchased by the different users (with different user IDs) is stored in the owned sound data table 32c, it is possible to curb utilization of sound data purchased by other users.

Also, the selected data is available if the user ID of the user who is using the instrument application program 32a matches the user ID associated with the selected sound data even in a case in which the sound data purchased by different users is stored in the owned sound data table 32c. In this manner, it is possible to prevent utilization of data properly acquired by the user themselves who is using the instrument application program 32a through purchase or the like from being limited while curbing utilization of sound data purchased by other users and thereby to secure user's convenience.

For granting the utilization of the selected sound data, not only matching of the user IDs and the model IDs but also the management information defined by the server 10 and related to the sound data that is available for the user indicated by the user ID are used as the granting of the utilization in the processes in S46 to S48 and S51 to S53 in FIG. 6. The PC 30 acquires the management information from the server 10 in advance, and the utilization of the sound data is granted on the basis of the acquired management information. Therefore, it is possible to grant the utilization of the sound data on the PC 30 on which the instrument application program 32a is executed without acquiring the management information by the PC 30 from the server 10 at a timing when the sound data is about to be used. It is thus possible to quickly determined the granting of the utilization as compared with a case in which granting of utilization of the sound data is determined on the server 10.

Further, in a case in which it is not possible to acquire the management information from the server 10 since the PC 30 is not connected to the server 10, it is possible to use the management information stored in the management information memory 32d in the PC 30 for granting the utilization of the sound data (S11: No, S19 in FIG. 5). Since it is possible to determine whether to grant the utilization of the sound data using the management information recently stored in the management information memory 32d even in a state in which the PC 30 is not connected to the server 10 in this manner, it is possible to improve convenience.

In order to use the management information recently stored in the management information memory 32d in the state in which the PC 30 is not connected to the server 10, it is necessary for the elapsed time from the clock time when the management information is stored to be within one week (S18: Yes, S19 in FIG. 5). If the elapsed time is within one week, there is a high probability that the management information in the management information memory 32d matches the management information in the server 10, and it is thus possible to allow the granting of the utilization of the sound data based on the management information recently stored and to improve convenience.

On the other hand, if the elapsed time exceeds one week, there is a high probability that the management information in the management information memory 32d does not match the management information in the server 10, and the user who is using the PC 30 can use the sound data that is originally not available for the user. Thus, it is possible to prevent the sound data that is not available any more from being permanently used by inhibiting the utilization of the stored management information and inhibiting the utilization of the sound data (S18: No, S20 in FIG. 5, S42: No, S56 in FIG. 6) in a case in which the elapsed time from the clock time when the management information is stored in the management information memory 32d exceeds one week.

Granting of the utilization of the sound data of the license types "2", "3", and "4" for the user changes on the basis of the management information defined by the server 10. On the other hand, granting of the utilization of the sound data of the license type "1" does not change on the basis of the management information defined by the server 10, and the utilization of the sound data permitted once for the user is permanently permitted. Therefore, in a case in which the user purchases the sound data of the license type "1", the sound ID of the sound data is basically always stored in the purchase history memory 21a of the individual management information 21 of the user who purchased the sound data.

Therefore, in a case in which the user IDs match each other in the process in S44 and the license type is "1" in the process in S46, the sound ID of the sound data associated with the license type is basically always included in the sound ID in the purchase history memory 21a, and the processes in S47 and S48 may thus be skipped, and the sound data selected at the time of the activation of the loading process may be stored in the work memory 33c. In the present embodiment, whether to grant the utilization of the sound data is checked using the management information through the processes in S47 and S48 even in a case in which the user IDs match each other in the process in S44 and the license type is "1" in the process in S46, and it is thus possible to prevent improper utilization such as falsification and utilization of the sound data of the license types "2", "3", and "4" as sound data of the license type "1", for example.

Returning to FIG. 1, the electronic musical instrument 50 will be described. The electronic musical instrument 50 includes a CPU 51, a flash ROM 52, and a RAM 53, each of which is connected to a bus line 54. Also, each of an external input/output terminal 55, a keyboard 56, operators 57, a display part 58 that displays an error message or the like, and a sound source 59 is connected to the bus line 54. A D/A 60 is connected to the sound source 59, and a speaker 61 is connected to the D/A 60.

The keyboard 56 is an input device for the user (player) inputting performance information. The operators 57 are input devices for inputting commands from the user such as adjustment of a variable value for creating/editing sound data.

The sound source 59 is a device that controls various effects and the like such as musical sound tone in accordance with sound generation signals from the CPU 51. The D/A 60 and the speaker 61 are configured similarly to the D/A 37 and the speaker 38 of the PC 30. The sound generation signals are output from the CPU 51 to the sound source 59 on the basis of inputs of performance information to the keyboard 56, and the sound generation signals are processed by the sound source 59. The processed sound generation signals are output to the speaker 61 via the D/A 60, and musical sound is emitted from the speaker 61.

The CPU 51 is an arithmetic operation device that controls each part connected via the bus line 54. The flash ROM 52 is a rewritable non-volatile memory. The flash ROM 52 is provided with each of a sound addition process program 52a, a model ID memory 52b, a user ID memory 52c, and a sound data memory 52d. In FIG. 1, the model ID memory 52b, the user ID memory 52c, and the sound data memory 52d are illustrated as "model ID", "user ID", and "sound data", respectively.

The sound addition process program 52a is a program that causes hardware (computer) to operate as the electronic musical instrument 50. The sound addition process (see FIG. 7) is executed as an interruption process when sound data to be copied to the sound data memory 52d in the flash ROM 52 is selected from the owned sound data table 45a in the recording medium 45 after the sound addition process program 52a is executed by the CPU 51.

The model ID memory 52b is a memory that stores a model ID unique to the sound addition process program 52a (electronic musical instrument 50). Until the timing when the electronic musical instrument 50 is shipped from a plant, the model ID unique to the electronic musical instrument 50 has already been stored in the model ID memory 52b. Also, the model ID memory 52b may be overwritten with the model ID unique to the updated sound addition process program 52a when the sound addition process program 52a is updated or the like.

Figure 7:
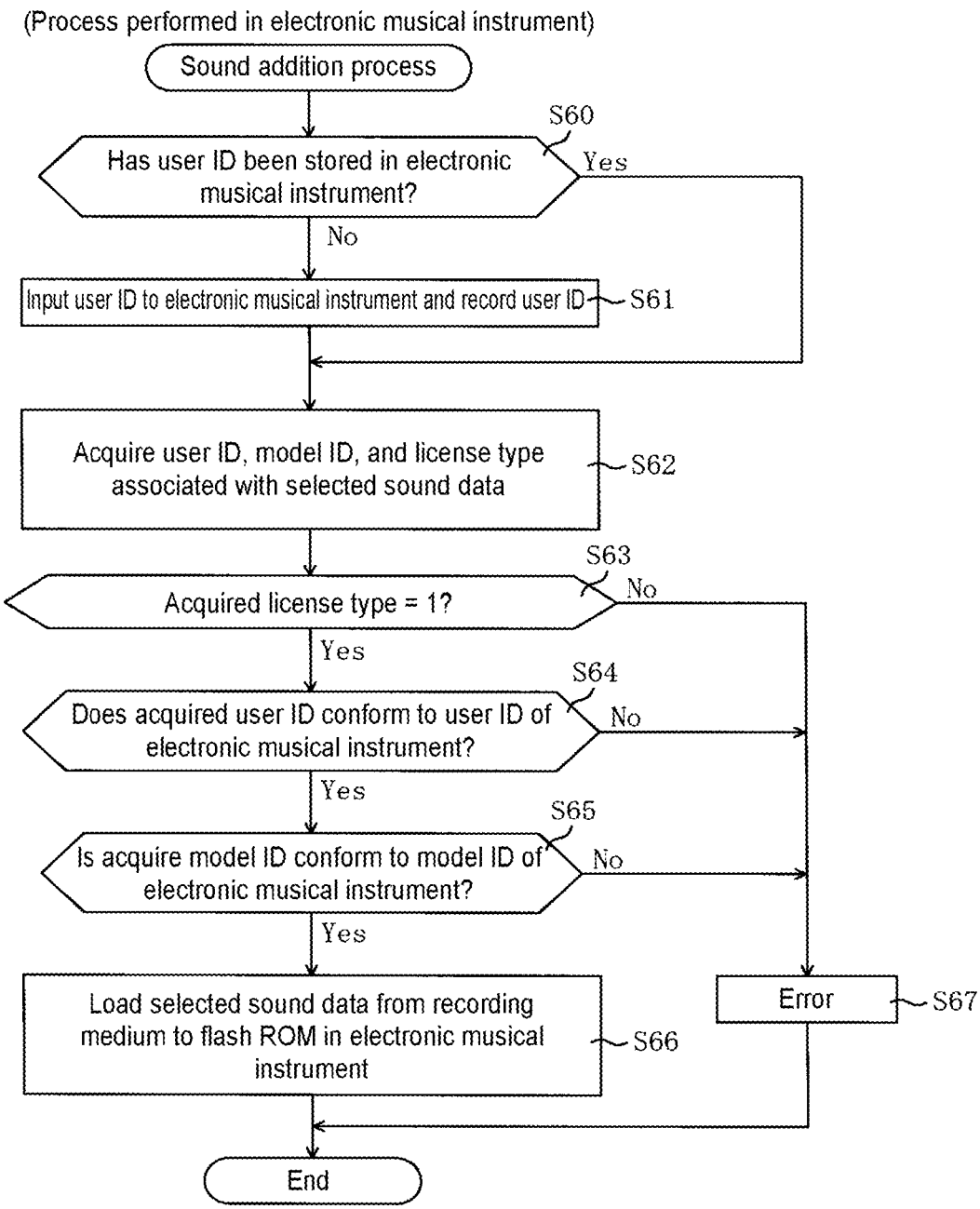
FIG. 7 is a flowchart of a sound addition process executed by a CPU of the electronic musical instrument

The user ID memory 52c is a memory that stores only one user ID of the user who owns the electronic musical instrument 50. An invalid value is stored in the user ID memory 52c at the timing when the electronic musical instrument 50 is shipped from the plant. Also, in a case in which an operation of clearing the value in the user ID memory 52c is performed, the user ID memory 52c is cleared by storing the invalid value in the user ID memory 52c. When the invalid value is included in the user ID memory 52c in the sound addition process in FIG. 7, the user ID input by the user using the operators 57 is stored in the user ID memory 52c (FIG. 7, S60, S61).

The sound data memory 52d is a memory that stores sound data acquired from the recording medium 45 via the external input/output terminal 55 in a state in which the sound data is available for the musical sound generation process. The sound data memory 52d can store a plurality of pieces of sound data.

The RAM 53 is a memory that stores various kinds of work data, flags, and the like in a rewritable manner when the CPU 51 executes programs such as the sound addition process program 52a. The RAM 53 is provided with a work memory 53a.

The work memory 53a is a memory that stores sound data to be used for the musical sound generation process (sound generation signal generation process) in accordance with inputs of the keyboard 56. The work memory 53a is initialized with preset sound data and sound data set to be read from the sound data memory 52d at the time of activation stored therein when a power is supplied to the electronic musical instrument 50. Also, the preset sound data is data stored in a predetermined region (not illustrated) in the flash ROM 52 at the timing when the electronic musical instrument 50 is shipped from the plant. In a case in which sound data in the sound data memory 52d is selected through operations of the operators 57, the sound data is stored in the work memory 53a.

The external input/output terminal 55 is an interface for transmitting and receiving various kinds of data to and from the portable recording medium 45. As described above, the owned sound data table 45a in the recording medium 45 stores all the sound data and the authentication information stored in the owned sound data table 32c in the PC 30.

Referring to FIG. 7, the sound addition process executed by the CPU 51 of the electronic musical instrument 50 will be described. When sound data to be copied from the recording medium 45 to the flash ROM 52 is selected after the CPU 51 executes the sound addition process program 52a, the sound addition process (see FIG. 7) is executed as an interruption process. In the sound addition process, storage of the user ID in the user ID memory 52c and granting of utilization of sound data are executed.

FIG. 7 is a flowchart of the sound addition process. In the sound addition process, whether or not the user ID stored in the user ID memory 52c in the flash ROM 52 in the electronic musical instrument 50 is valid, that is, whether or not the user ID of the user who owns the electronic musical instrument 50 has already been registered (stored) in the electronic musical instrument 50 is checked (S60). In a case in which the user ID has not yet been registered in the electronic musical instrument 50 (S60: No), the user ID input by the user using the operators 57 is stored in the user ID memory 52c of the electronic musical instrument 50 (S61), and the process in S62 is performed.

On the other hand, in a case in which the user ID stored in the user ID memory 52c is valid in the process in S60, that is, in a case in which the user ID of the user who owns the electronic musical instrument 50 has already been stored in the electronic musical instrument 50 (S60: Yes), the process in S61 is skipped, and the process in S62 is performed.

In the process in S62, each of the user ID, the model ID, and the license type stored in the owned sound data table 45a in the recording medium 45 in association with the sound data selected at the time of the activation of the sound addition process is acquired.

Whether or not the license type acquired in the process in S62 is the license type "1" that the utilization form of the sound data is based on purchase is checked (S63). In a case in which the license type is not "1" (S63: No), the sound data selected at the time of the activation of the sound addition process is not compatible with the utilization for the electronic musical instrument 50, the sound addition process is ended with the utilization of the selected sound data inhibited, that is, without storing, in the sound data memory 52d in the electronic musical instrument 50, the sound data in the owned sound data table 45a in the recording medium 45 in an available state (S67).

For example, the sound data Nos. 2, 3, and 4 (sound IDs "1", "9", and "10") of the license types "2", "3", and "4" in the sound data stored in the owned sound data table 45a illustrated in FIG. 3 cannot be stored in the electronic musical instrument 50 and is not available for the musical sound generation process of the electronic musical instrument 50. The reason that the sound data of the license types "2", "3", and "4" is not available for the electronic musical instrument 50 will be described.

Granting of utilization of the sound data of the license types "2", "3", and "4" for the user changes on the basis of the management information defined in the server 10. Also, since the electronic musical instrument 50 cannot be connected to the server 10 that has the management information, the management information has not been acquired or stored (the electronic musical instrument 50 does not have the management information). Therefore, it is possible to prevent the sound data from being permanently used by the electronic musical instrument 50 that does not have the management information by inhibiting the utilization of the sound data of the license types "2", "3", and "4", the utilization granting of which changes on the basis of the management information that the server 10 has, in the electronic musical instrument 50 (inhibiting storage of the sound data in the electronic musical instrument 50).

Further, in the process in S67, an error message related to the inhibition of the utilization of the selected sound data is displayed on the display part 58. An error message of a non-compatible license type or the like may be displayed as an error message displayed in the process in S67 in a case in which the license type is not "1" (S63: No).

In a case in which the license type acquired in the process in S62 is "1" in the process in S63 (S63: Yes), there is a probability that the sound data selected at the time of the activation of the sound addition process is available (the sound data can be stored in the electronic musical instrument 50), and the process in S64 is thus performed. This is because the granting of the utilization of the sound data of the license type "1" does not change on the basis of the management information defined in the server 10 and the utilization of the sound data permitted once for the user is permanently permitted.

In the process in S64, whether or not the user ID acquired in the process in S62 matches the user ID stored in the user ID memory 52c in the electronic musical instrument 50 and indicating the user who owns (is using) the electronic musical instrument 50 is checked. In a case in which the user IDs do not match each other (S64: No), the process in S67 of inhibiting the utilization of the sound data selected at the time of the activation of the sound addition process is performed, and the sound addition process is then ended.

In a case in which the user ID acquired in the process in S62 matches the user ID of the electronic musical instrument 50 in the process in S64 (S64: Yes), there is a probability that the sound data selected at the time of the activation of the sound addition process is available, and whether or not at least one model ID acquired in the process in S62 matches the model ID that is stored in the model ID memory 52b and is unique to the electronic musical instrument 50 is thus checked (S65).

In a case in which the model IDs do not match each other (S65: No), the process in S67 of inhibiting the utilization of the sound data selected at the time of the activation of the sound addition process is performed, and the sound addition process is then ended. An error message that the model IDs do not match each other or the like may be displayed as an error message displayed in the process in S67 in a case in which the model IDs do not match each other (S65: No).

In a case in which the model ID acquired in the process in S62 matches the model ID of the electronic musical instrument 50 in the process in S65 (S65: Yes), it is determined that the sound data selected at the time of the activation of the sound addition process is available for the musical sound generation process, the selected sound data is thus stored in the sound data memory 52d in the flash ROM 52 in the electronic musical instrument 50 from the recording medium 45 (S66), and the sound addition process is ended.

Although the above description has been given hitherto, it is possible to easily expect that the disclosure is not limited to the aforementioned embodiment and that various improvements and modifications can be made without departing from the gist of the disclosure. For example, the disclosure is not limited to the case in which the sound source 59 incorporated in the electronic musical instrument 50 is used, and the electronic musical instrument 50 may be connected to an external sound source device. The disclosure is not limited to the case in which one server 10 (distribution server) transmits sound data, authentication information, and management information to the PC 30, and the distribution server may be configured with a server group including a server that transmits sound data and authentication information to the PC 30 and a server that transmits management information to the PC 30.

Also, the disclosure is not limited to the case in which the PC 30 acquires the management information and the like directly from the distribution server via the Internet 2. The management information may be transmitted from the distribution server to a device that is different from the PC 30, such as a PC or a smartphone, via the Internet 2, and the management information may then be transmitted from the various devices to the PC 30 via the Internet 2 or a portable storage device. In other words, the PC 30 may acquire the management information from the distribution server via various devices, a storage device, or the like, or the management information may be acquired from the distribution server or an external device such as various devices or a storage device.

Also, the disclosure is not limited to the case in which the CPU 31 in the PC 30 on which the instrument application program 32*a* has been executed executes the timer process at every one hour, and the interval at which the timer process is executed may be appropriately changed. Although the case in which the management information updating flag 33*b* is turned on if the elapsed time from the clock time when the management information acquired from the server is stored in the management information memory 32*d* in the PC 30 is within one week in the state in which the PC 30 is not connected to the server 10 (S11: No, S18: Yes, S19) has been described, the disclosure is not necessarily limited thereto. The elapsed time when the management information updating flag 33*b* is turned on may be appropriately changed.

Although the case in which the process of selecting the sound data to be used for the musical sound generation process from the HDD 32 and acquiring the sound data by the CPU 31 (at the time of the activation of the loading process) and the process in S43 of acquiring the sound ID, the user ID, the model ID, and the license type associated with the sound data by the CPU 31 are performed at different timings has been described in the aforementioned embodiment, the disclosure is not necessarily limited thereto. The CPU 31 may be caused to acquire the user ID and the like associated with the selected sound data along with the sound data when the sound data to be used for the musical sound generation process is selected from the HDD 32.

Although the case in which the PC 30 operates as a synthesizer using the instrument application program 32*a* that causes a computer to execute the musical sound generation process using sound data and a case in which the electronic musical instrument 50 including the sound addition process program 52*a* is a synthesizer have been described in the aforementioned embodiment, the disclosure is not necessarily limited thereto. The electronic musical instrument using sound data for the musical sound generation process may be configured with an electronic keyboard instrument other than the synthesizer, such as an electronic piano or an electronic organ, an electronic percussion instrument, or an electronic guitar, and the disclosure may be applied to a program that causes a computer to operate as the electronic musical instrument.

Although the case in which the final access clock time indicating a clock time when the management information is stored in the management information memory 32*d* is stored in the individual management information 21 in the management information stored in the management information memory 32*d* has been described in the aforementioned embodiment, the disclosure is not necessarily limited thereto. The final access clock time may be stored in a predetermined region in the HDD 32 in the PC 30.

Although the case in which the process in S44 of matching the user IDs, the process in S45 of matching the model IDs, and the processes in S46 to S48 and S51 to S53 of matching the sound IDs for each license type are performed in order in the sound data loading process of the PC 30 illustrated in FIG. 6 has been described in the aforementioned embodiment, the disclosure is not necessarily limited thereto. The order of the processes may be appropriately changed. Also, the process in S42 of checking whether or not the management information updating flag 33*b* has been turned on may be performed after the processes in S44 and S45 on the assumption that the process in S42 is performed before the processes in S46 to S48 and S51 to S53. Similarly, the order of the process in S63 related to the license type, the process in S64 of matching the user IDs, and the process in S65 of matching the model IDs may be similarly appropriately changed even in the sound addition process of the electronic musical instrument 50 illustrated in FIG. 7.

Although the case in which the HDD 32 incorporated in the PC 30 is provided with the owned sound data table 32*c* and the management information memory 32*d* has been described in the aforementioned embodiment, the disclosure is not necessarily limited thereto. The recording medium 45 or another non-volatile memory connected to the external input/output terminal 42 of the PC 30 may be provided with the owned sound data table 32*c* and the management information memory 32*d*.

The case in which the electronic musical instrument 50 in the aforementioned embodiment executes the sound addition process in FIG. 7 in a case in which sound data stored in the owned sound data table 45*a* in the recording medium 45 is copied to the sound data memory 52*d* in the electronic musical instrument 50 has been described, the disclosure is not necessarily limited thereto. The sound data memory 52*d* may be omitted, and the sound addition process may be performed when it is attempted to temporarily store the sound data in the work memory 53*a* to use the sound data in the recording medium 45 for the musical sound generation process. In this case, in the process in S66, the sound data selected at the time of the activation of the sound addition process is stored in the work memory 53*a* in the PC 30 from the recording medium 45, such that the sound data is available for the musical sound generation process. Also, the sound data memory 52*d* may be omitted, and the aforementioned sound addition process may be executed in a case in which the owned sound data table 45*a* in the recording medium 45 is copied to the flash ROM 52 in the electronic musical instrument 50 and the sound data stored in the owned sound data table 45*a* in the flash ROM 52 is selected.

Although the case in which the electronic musical instrument 50 in the aforementioned embodiment acquires the sound data and the authentication information from the PC 30 via the recording medium 45 has been described, the disclosure is not necessarily limited thereto. A communication part for connection to the Internet 2 may be provided in the electronic musical instrument 50, the owned sound data table 32*c* may be provided in the flash ROM 52 in the electronic musical instrument 50 instead of the management information memory 32*d* and the sound data memory 52*d*, the management information updating flag 33*b* may be provided in the RAM 33, and the RTC 41 may be connected to the bus line 54. In this manner, the electronic musical instrument 50 can also execute each of the processes illustrated in FIGS. 4(*a*) to 6 similarly to the PC 30.

Also, the electronic musical instrument 50 may be caused to store or acquire the management information by connecting the recording medium 45 storing the management information in the predetermined region to the electronic musical instrument 50 or copying the management information in the recording medium 45 in the predetermined region in the flash ROM 52 in the electronic musical instrument 50, and the management information updating process may be performed immediately after the power is supplied to the electronic musical instrument 50 or on a periodic basis. As the management information updating process in this case, the processes in S17 to S20 in FIG. 5 are executed. It is thus possible to perform the processes in S62 to S67 in the sound addition process of the electronic musical instrument 50 similarly to the sound data loading process of the PC 30.

Although the case in which if the user registration in a service for obtaining sound data from the server 10 is canceled, the individual management information 21 related to the user, the registration of which is canceled, is deleted from the management information memory 12b in the server 10 has been described in the aforementioned embodiment, the disclosure is not limited thereto. "Non-member" may be set in the subscription authority of the user, the registration of which has been canceled, without deleting the individual management information 21 related to the user, the registration of which has been canceled. In this case, it is possible to allow the user to obtain the sound data on the basis of a past purchase history when the user registers the service again. Also, in a case in which the individual management information 21 related to the user, the registration of which has been canceled, is left, whether or not the subscription authority is "non-member" is checked in the process in S13 in FIG. 5, and the process in S14 is performed if the subscription authority is not "non-member", or the process in S16 is performed if the subscription authority is "non-member".

Although the case in which the process in S44 of matching the user IDs, the process in S45 of matching the model IDs, and the processes in S46 to S48 and S51 to S53 of matching the sound IDs for each license type are performed in the sound data loading process of the PC 30 in the aforementioned embodiment has been described, the disclosure is not limited thereto. At least one of the user ID, the model ID, and the license type stored in the owned sound data tables 32c and 45a in association with the sound data may be omitted, and matching using the omitted one may be omitted.

Although the case in which the identifier "-" that matches all the model IDs is set for the model ID associated with the license type "3" in the product information table 23a in the aforementioned embodiment has been described, the disclosure is not limited thereto. "-" may be set for the model ID associated with the license types "1", "2", and "4". Also, a plurality of model IDs may be set as the model IDs associated with the license types "1", "2", and "3".

Although the instrument application program 32a that causes the CPU 31 to execute the processes in S1 to S3 in FIG. 4(a), the timer process in FIG. 4(b), the sound data loading process and the musical sound generation process in FIG. 6 has been described in the aforementioned embodiment, the disclosure is not necessarily limited thereto. The instrument application program 32a may include a management information updating program of causing the CPU 31 to execute the processes in S1 to S3 at the time of the activation and the timer process and a musical instrument application main part program of causing the CPU 31 to execute the processes in S1 and S2 at the time of the activation, the sound data loading process, and the musical sound generation process. Also, in a case in which the processing based on the management information updating program is ended to prevent the timer process from being executed, the management information updating flag 33b is set to be OFF. In this manner, it is possible to end the management updating program when the management information updating flag 33b is turned on and to prevent the musical instrument application main part program from continuing to grant the utilization of the sound data using old management information.

Moreover, the processes in S1 and S2 in the management information updating program and the processes in S1 and S2 in the musical instrument application main part program are different processes. Therefore, each of the user ID memory that stores the user ID in the process in S2 in the management information updating program and the user ID memory that stores the user ID in the process in S2 in the musical instrument main part program may be provided in the HDD 32 or the like. In this case, whether or not the user IDs in the two user ID memories match each other is checked before the process in S42 in FIG. 6, and the process in S42 is performed if the user IDs match each other, or the process in S56 is performed if the user IDs do not match each other. Also, the order of the process of checking whether or not the user IDs of the two user ID memories match each other and the process in S42 may be opposite. In this manner, it is possible to prevent the utilization of the sound data from being granted using the individual management information 21 of a user who is different from the user who has logged in the musical instrument application main part program for utilization.

However, one user ID memory 33a may be provided, and in a case in which a user ID is stored in the user ID memory 33a before in the processes in S1 and S2 in the management information updating program, automatic logging-in may be performed in the process in S1 in the musical instrument application main part program using the user ID. In this manner, it is possible to omit efforts of the user of inputting the same logging-in information and to prevent the utilization of the sound data from being granted using the individual management information 21 of another user. Further, it is possible to omit efforts of the user to log in a plurality of musical instrument application main part programs if the user logs in the management information updating program once even in a case in which the plurality of musical application main part programs are executed on the PC 30.

Although the PC 30 has been exemplified as the computer that executes the instrument application program 32a in the aforementioned embodiment, the disclosure is not limited thereto, and a device such as a smartphone or a tablet terminal may execute the instrument application program 32a. Also, the disclosure may be applied to a dedicated device that executes only the instrument application program 32a with the instrument application program 32a stored in a ROM or the like.

The numerical values described in the aforementioned embodiment are just examples, and it is a matter of course that other numerical values may be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A non-transitory computer-readable medium comprising computer-readable instructions such that, when executed, causes processing electronics of a computer to control the computer to:
   store authentication information, the authentication information including a license type associated with each of a plurality of separately selectable sound data, and a sound ID associated with each of the plurality of selectable sound data;
   acquire a sound ID and a license type associated in the authentication information with sound data selected from the plurality of separately selectable sound data;
   determine that the license type associated with the selected sound data is a subscription type license;
   determine whether the sound ID associated with the selected sound data is associated with at least one subscription type, upon determining that the license type associated with the sound data is a subscription type license; and enable loading into working memory the selected sound data associated in the authentication information with the sound ID upon determining that the sound ID of the selected sound data is associated with the at least one subscription type, or enable generating audible sound based on the selected sound data associated in the authentication information with the sound ID upon determining that the sound ID of the selected sound data is associated with the at least one subscription type.

2. The non-transitory computer readable medium according to claim 1, wherein, to determine whether the sound ID is associated with at least one subscription type comprises causing the processing electronics to control the computer to:

access subscription information for at least one subscription type, the subscription information including one or more sound IDs associated with each respective subscription type of the at least one subscription type; and determine whether the sound ID associated with the selected sound data is associated with the at least one subscription type in the accessed subscription information.

3. The non-transitory computer readable medium according to claim 2, wherein the at least one subscription type comprises at least one first subscription type and the accessed subscription information for each first subscription type includes the sound ID associated with one or more, but not all, of the plurality of separately selectable sound data.

4. The non-transitory computer readable medium according to claim 3, wherein the plurality of subscription types comprises a second subscription type and the accessed subscription information for the second subscription type includes the sound ID associated with all of the plurality of separately selectable sound data.

5. The non-transitory computer readable medium according to claim 1, further causing the computer to generate sound based, at least in part, on the at least one selected sound data item, upon loading the at least one sound data item into the working memory or upon enabling generating audible sound.

6. The non-transitory computer readable medium according to claim 1, further causing the computer to inhibit execution of the musical sound generation process using the first sound data in a case in which it is determined that the license type associated with the sound data is a subscription type license, and that the sound ID associated with the selected sound data is not associated with the at least one subscription type.

7. The non-transitory computer readable medium according to claim 1, wherein the computer-readable instructions further cause the processing electronics to control the computer to receive information identifying the selected sound data, before determining that the license type associated with the selected sound data is a subscription type license.

8. The non-transitory computer readable medium according to claim 1, further causing the computer to:

determine, in response to receiving information identifying the selected sound data, whether the stored authentication information is updated;

wherein the acquiring of the sound ID and the license type is carried out in response to determining that the stored authentication information is updated.

9. The non-transitory computer readable medium according to claim 8, further causing the computer to inhibit execution of the musical sound generation process using the first sound data in a case in which it is determined that the stored authentication information is not updated.

10. A system for controlling sound generation for an electronic musical instrument, the system comprising processing electronics and electronic memory, wherein the processing electronics is configured to:

store authentication information in the electronic memory, the authentication information including a license type associated with each of a plurality of separately selectable sound data, and a sound ID associated with each of the plurality of selectable sound data;

acquire a sound ID and a license type associated in the authentication information with sound data selected from the plurality of separately selectable sound data;

determine that the license type associated with the selected sound data is a subscription type license;

determine whether the sound ID associated with the selected sound data is associated with at least one subscription type, upon determining that the license type associated with the sound data is a subscription type license; and enable loading into working memory the selected sound data associated in the authentication information with the sound ID, or enable generating audible sound based on the selected sound data associated in the authentication information with the sound ID, upon determining that the sound ID of the selected sound data is associated with at least one subscription type.

11. The system according to claim 10, wherein, to determine whether the sound ID is associated with at least one subscription type, the processing electronics is further configured to:

access subscription information for a plurality of subscription types, the subscription information including one or more sound IDs associated with each one of the plurality of subscription types; and determine whether the sound ID associated with the selected sound data is associated with at least one subscription type in the accessed subscription information.

12. The system according to claim 11, wherein the plurality of subscription types comprises at least one first subscription type and the accessed subscription information for each first subscription type includes the sound ID associated with one or more, but not all, of the plurality of separately selectable sound data.

13. The system according to claim 12, wherein the plurality of subscription types comprises a second subscription type and the accessed subscription information for the second subscription type includes the sound ID associated with all of the plurality of separately selectable sound data.

14. The system according to claim 10, wherein the processing electronics is further configured to generate sound based at least on part on the at least one selected sound data item, upon loading the at least one sound data item into the working memory or upon enabling generating audible sound.

15. The system according to claim 10, wherein the processing electronics is further configured to inhibit execution of the musical sound generation process using the first sound data in a case in which it is determined that the license type associated with the sound data is a subscription type license, and that the sound ID associated with the selected sound data is not associated with at least one subscription type.

16. The system according to claim 10, wherein the processing electronics is further configured to receive information identifying the selected sound data, before determining that the license type associated with the selected sound data is a subscription type license.

17. The system according to claim 10, wherein the processing electronics is further configured to:
determine, in response to receiving information identifying the selected sound data, whether the stored authentication information is updated;
wherein the acquiring of the sound ID and the license type is carried out in response to determining that the stored authentication information is updated.

18. The system according to claim 17, wherein the processing electronics is further configured to inhibit execution of the musical sound generation process using the first sound data in a case in which it is determined that the stored authentication information is not updated.

19. A method for controlling sound generation for an electronic musical instrument, the method comprising:
storing authentication information in an electronic memory, the authentication information including at least one subscription type associated with each of a plurality of separately selectable sound data, and a sound ID associated with each of the plurality of selectable sound data;
acquiring, with processing electronics, a sound ID and at least one subscription type associated in the authentication information with sound data selected from the plurality of separately selectable sound data;
determining, with the processing electronics, whether the sound ID associated with the selected sound data is associated with at least one subscription type; and
enabling with the processing electronics, loading into working memory the selected sound data associated in the authentication information with the sound ID, or enabling with the processing electronics, generating audible sound based on the selected sound data associated in the authentication information with the sound ID, upon determining that the sound ID of the selected sound data is associated with at least one subscription type.

20. A method for controlling sound generation for an electronic musical instrument, the method comprising:
storing authentication information in an electronic memory, the authentication information including a license type associated with each of a plurality of separately selectable sound data, and a sound ID associated with each of the plurality of selectable sound data;
acquiring, with processing electronics, a sound ID and a license type associated in the authentication information with sound data selected from the plurality of separately selectable sound data;
determining, with the processing electronics, that the license type associated with the selected sound data is a subscription type license;
determining, with the processing electronics, whether the sound ID associated with the selected sound data is associated with at least one subscription type, upon determining that the license type associated with the sound data is a subscription type license; and
enabling with the processing electronics, loading into working memory the selected sound data associated in the authentication information with the sound ID, or enabling with the processing electronics, generating audible sound based on the selected sound data associated in the authentication information with the sound ID, upon determining that the sound ID of the selected sound data is associated with at least one subscription type.

21. The method according to claim 20, wherein determining whether the sound ID is associated with at least one subscription type comprises:
accessing subscription information for a plurality of subscription types, the subscription information including one or more sound IDs associated with each one of the plurality of subscription types; and
determining whether the sound ID associated with the selected sound data is associated with at least one subscription type in the accessed subscription information.

* * * * *